United States Patent [19]

Iwasaki

[11] Patent Number: 5,191,358
[45] Date of Patent: Mar. 2, 1993

[54] LIGHT SCANNING DEVICE WITH MICROLENSES HAVING A SAME POWER DENSITY DISTRIBUTION AS A POWER DENSITY DISTRIBUTION OF A PHOTOSETTING LIGHT BEAM

[75] Inventor: Takeo Iwasaki, Nagoya, Japan

[73] Assignee: Brother Kogyo Kabushiki Kaisha, Nagoya, Japan

[21] Appl. No.: 669,058

[22] Filed: Mar. 14, 1991

[30] Foreign Application Priority Data

Mar. 16, 1990 [JP] Japan .................................. 2-67971
Mar. 20, 1990 [JP] Japan .................................. 2-71348
Mar. 20, 1990 [JP] Japan .................................. 2-71349
Mar. 20, 1990 [JP] Japan .................................. 2-71350

[51] Int. Cl.$^5$ .......................... G01D 9/42; G02F 1/13
[52] U.S. Cl. .................................. 346/107 R; 359/40
[58] Field of Search ............... 346/107 R; 359/40, 41, 359/654

[56] References Cited

U.S. PATENT DOCUMENTS 4,315,964 2/1982 Ozaki et al. .......................... 428/182
4,703,334 10/1987 Mochimaru et al. ....... 346/107 R X
4,790,632 12/1988 Miyakawa et al. .................... 359/40

FOREIGN PATENT DOCUMENTS 60-165623 8/1985 Japan .

Primary Examiner—Benjamin R. Fuller
Assistant Examiner—David Yockey
Attorney, Agent, or Firm—Oliff & Berridge

[57] ABSTRACT

A light scanning device of the present invention comprises: a light source for emitting light; a liquid crystal shutter array comprising a plurality of liquid crystal shutters arranged in a first direction, the liquid crystal shutter array receiving image signals to selectively open the liquid crystal shutters in response to the image signals, to thereby selectively allow the light emitted from the light source to pass therethrough; a photosensitive member for receiving the light which has passed through the liquid crystal shutter array, said photosensitive member being conveyed in a second direction perpendicular to the first direction to thereby form a latent image thereon corresponding to the image signals; and focusing means provided on each of the liquid crystal shutters for focusing the light having passed through said liquid crystal shutter array onto the photosensitive member, the focusing means being formed of a photosetting material.

12 Claims, 3 Drawing Sheets

LIGHT SCANNING DEVICE WITH MICROLENSES HAVING A SAME POWER DENSITY DISTRIBUTION AS A POWER DENSITY DISTRIBUTION OF A PHOTOSETTING LIGHT BEAM

BACKGROUND OF THE INVENTION

The present invention relates to a light scanning device for optical printers or the like.

An optical printer was recently used as an output device of a computer and is replacing the line printer. There are various types of optical printers. A liquid crystal printer is one type of optical printer. Such a liquid crystal printer comprises a crystal shutter array and utilizes an electrophotographic process.

A light scanning device for the liquid crystal printer is described below with reference to the accompanying drawings.

FIG. 5 shows a light scanning device 30 applied to the liquid crystal printer. The light scanning device 30 is placed to confront a peripheral surface of a photosensitive drum 20. The light scanning device 30 comprises a rod-shaped light source 11 such as a fluorescent lamp which extends parallel to an rotational axis of the drum 20. Light is radiated from the light source 11 toward a liquid crystal shutter array 15. The liquid crystal shutter array 15 comprises a plurality of liquid crystal microshutters 12 arranged in a line extending parallel to the axis of the drum 20, each microshutter 12 corresponding to a picture element. The microshutter 12 is formed of a liquid crystal and crystal voltages applied to the liquid change the microshutter's light transmitting property. The microshutter changes between a state where the microshutter allows the light to pass therethrough and a state where the microshutter prevents the light from passing therethrough. The state where the microshutter allows the light to pass therethrough will be referred to as a state where "the microshutter is opened", and the state where the microshutter prevents the light to pass therethrough will be referred to as a state where "the microshutter is closed", hereinafter. The liquid crystal shutter array 15 receives image signals and controls the microshutters in accordance with the image signals so that the microshutters may be selectively opened to allow the light from the light source 11 to pass through to generate optical dot patterns. Each dot corresponds to one picture element. Each dot of the generated dot patterns is in a square shape with its side being 85 micrometers, for a liquid crystal printer having a resolution of 300 dpi to which the optical scanning device 30 is applied. The optical dot patterns generated by the liquid crystal shutter array 15 are then focused onto the peripheral surface of the photosensitive drum 20, with the use of an optical focusing means 34 such as a fiber lens array (SELFOC lens array) having a magnification of 1 to form picture element patterns on the peripheral surface of the drum. One line on the peripheral surface of the drum 20 extending parallel to the rotational axis and confronting the light scanning device 30 is exposed to the dot pattern light. The drum 20 is rotated at a predetermined amount (rotational angle). Another line on the peripheral surface of the drum next to the exposed line confronts the device 30 and is exposed to the dot pattern light. Thus, lines on the peripheral surface of the photosensitive drum 20 extending parallel to the rotational axis are one by one exposed to the dot pattern light, as the drum is rotated. The above-described exposure system is called a "line scanning exposure system".

In the line scanning exposure system, it is necessary to use an optical system 34 such as a focusing fiber lens array. Therefore, the optical scanning device 10 utilizing such a line scanning exposure system is expensive and has a large size.

On the other hand, without the optical system 34, the light radiated from the liquid crystal shutter array 15 has a certain amount of spread angle, so that each dot of the dot patterns obtained on the peripheral surface of the drum 20 has a large size because the liquid crystal shutter array has a certain amount of spread angle. As a result, the dots of the dot patterns overlap with one another and lower the quality of the obtained picture image. Alternatively, the liquid crystal shutter array 15 may be arranged in close contact with the peripheral surface of the photosensitive drum 20 without the optical system 34. However, the toner carried on the drum is attached to the shutter array and such arrangement lowers the image quality.

SUMMARY OF THE INVENTION

The present invention solves the above-described problems. An object of the present invention is to provide a cheap and small-sized optical scanning device which does not use the optical system such as a focusing fiber lens. The present invention is also able to accurately focus the light from the shutter array onto the peripheral surface of the photosensitive drum.

In order to attain the object and other objects, a light scanning device of the present invention comprises: a light source for emitting light; a liquid crystal shutter array comprising a plurality of liquid crystal shutters arranged in a first direction, the liquid crystal shutter array receiving image signals to selectively open the liquid crystal shutters in response to the image signals, to thereby selectively allow the light emitted from the light source to pass therethrough; a photosensitive member for receiving the light which has passed through the liquid crystal shutter array, said photosensitive member being conveyed in a second direction perpendicular to the first direction to thereby form a latent image thereon corresponding to the image signals; and focusing means provided on each of the liquid crystal shutters for focusing the light having passed through said liquid crystal shutter array onto the photosensitive member, the focusing means being formed of a photosetting material.

In the optical scanning device according to the present invention constructed as above, the liquid crystal shutter array selectively allows light radiated from the light source to pass through, in accordance with image signals applied thereto. Since each of the liquid crystal shutters of the shutter array is provided with the focusing means made of a photosetting resin, the light having passed through the liquid crystal shutter array is accurately focused by the focusing means onto the peripheral surface of the drum.

According to another aspect of the present invention, a method for producing a microlens on each of liquid crystal shutters of a liquid crystal shutter array comprises the steps of: placing the liquid crystal shutter array on a photosetting material, with at least one of the liquid crystal shutters being in an opened state; and introducing light to the opened state liquid crystal shutter so that the light may reach the photosetting material, the light having a power density distributed in a predetermined distribution over an area of the opened shutter, to thereby harden the photosetting material to form a microlens on the liquid crystal shutter.

According to the method of producing a microlens on each of the liquid crystal shutters of the present invention, it becomes possible to easily provide a small microlens on a very small liquid crystal shutter. It becomes possible to easily produce the microlens which has such a shape so as to accurately focus the light onto the photosensitive drum.

DETAILED DESCRIPTION OF THE PREFERRED EMBODIMENT

The preferred embodiment of the present invention will be described in detail with reference to the accompanying drawings.

Figure 1:
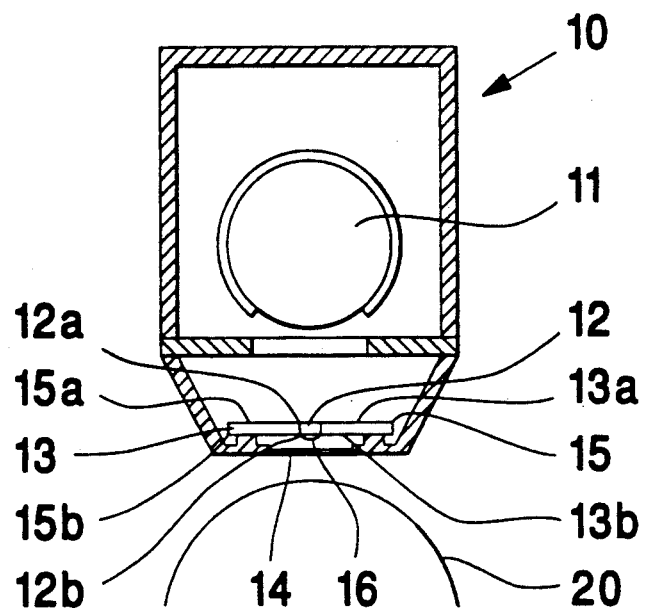
FIG. 1 is a schematic sectional view of an optical scanning device of a preferred embodiment of the present invention.

FIG. 1 shows an optical scanning device of an embodiment of the present invention. In FIG. 1, like elements are designated by the same reference numerals or characters as those shown in FIG. 5. Descriptions on the same elements is omitted to avoid duplicate description.

As shown in FIG. 1, an optical scanning device 10 of the present invention comprises a fluorescent lamp 11 serving as a light source, a liquid crystal shutter array 15 including a plurality of liquid crystal microshutters 12 for generating optical dot patterns, each dot corresponding to a picture element, focusing means 16 for focusing the optical dots generated by the shutter array 15 onto a peripheral surface of a photosensitive drum 20, and a toner proof glass 14 for protecting the focusing means 16 from toner.

An aperture type fluorescent lamp for radiating monochromatic light with a fixed amount is used as the fluorescent lamp 11. The lamp is always lighted, and the lighting of the lamp is carryed out at a high frequency.

The liquid crystal shutter array 15 comprises a panel 13 of a long and narrow plate shape having upper and lower surfaces 13a and 13b and extending along a printing width direction which is parallel to a rotational axis of the photosensitive drum 20 and transverse to a rotational direction of the drum (printing direction). In the panel 13, a plurality of liquid crystal microshutters 12 are arranged in a line extending along a longitudinal direction of the panel 13, i.e., along a direction parallel to the rotational axis of the photosensitive drum.

The microshutter 12 is a rectangular by shaped parallelepiped and has top and bottom surfaces 12a and 12b. The top and bottom surfaces 12a and 12b are square shaped. The microshutter 12 is formed in the panel 13 such that the top and bottom surfaces 12a and 12b of the microshutter 12 are in alignment with the upper and lower surfaces 13a and 13b of the panel 13, respectively. The top surface 12a of the microshutter 12 and the upper surface 13a of the panel 13 form an upper surface 15a of the liquid crystal shutter array 15, and the bottom surface 12a of the microshutter 12 and the lower surface 13a of the panel 13 form a lower surface 15b of the liquid crystal shutter array 15. The upper surface 15a of the shutter array 15 confronts the light source 11, and the lower surface 15b confronts the peripheral surface of the drum 20.

The liquid crystal microshutters 12 are selectively opened and closed, in accordance with image signals applied thereto, so that the microshutters selectively allow light from the fluoroscent lamp to pass therethrough. Thus, the microshutters 12 serve as an optical mask for forming optical dot patterns from the light emitted from the light source 11. Each microshutter corresponds to one optical dot for forming one picture element on the peripheral surface of the drum 20.

According to the present invention, each of the microshutters is provided with a microlens 16 formed of a photosetting resin which serves as the focusing means. The microlens is formed on the bottom surface 12b of the microshutter 12 confronting the drum 20. The microlens 16 focuses the optical dot generated by the microshutter 12 onto the peripheral surface of the photosensitive drum 20.

The toner proofing glass 14 is made of a thin glass plate and prevents the toner on the photosensitive drum 20 from contacting to the microlens 16.

Figure 2:
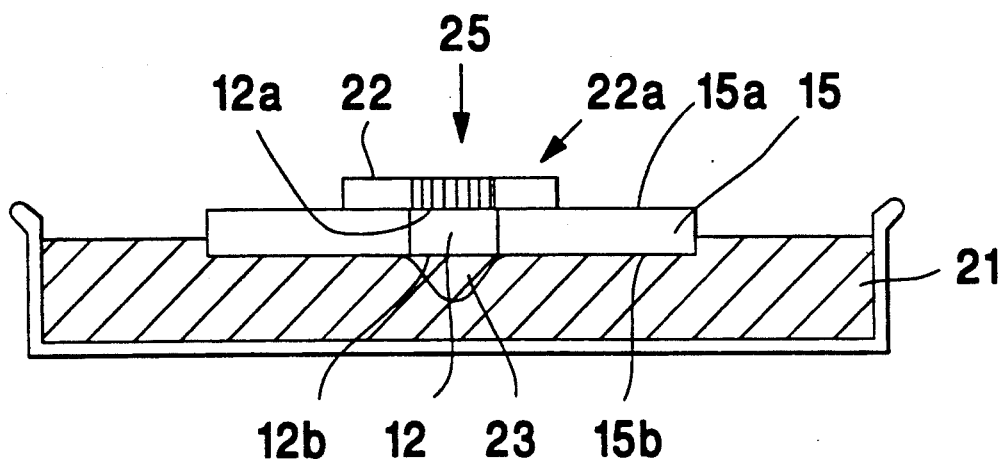
FIG. 2 is a view illustrating a method for producing a microlens of the present invention.

A method for producing the microlens 16 will be described below with reference to FIG. 2. According to this method, a photosetting resin is hardened by light having passed through a light transmittance distribution mask, to thereby form the microlens.

The microlens 16 is formed on the lower surface 15b of the liquid crystal shutter array 15 by the following steps.

(A) The lower surface 15b of the liquid crystal shutter array 15 is immersed in photosetting material 21. The photosetting material 21 is a material made of, for example, an acrylic ester polymer mixed with an initiator. The acrylic ester polymer is an ultraviolet light setting resin which is curable by the ultraviolet light and which has a refractive index n of about 1.54 when hardened.

(B) All of the microshutters 12 of the shutter array 15 are opened. A mask array 22a having a plurality of light transmittance distribution masks 22 arranged in a line is placed on the upper surface 15a of the shutter array 15 so that each of the masks 22 may be accurately positioned on the upper surface 12a of each of the shutters 12. Each transmittance distribution mask 22 has been produced through photomechanical processings to have a light transmittance distribution that allows light having passed through the mask to have a light intensity distributed approximately in a Gaussian distribution in a region of each microshutter.

(C) Then, light 25 for setting the light setting resin 21 is uniformly radiated onto the entire surface 15a of the shutter array 15 through the light transmittance distribution mask array 22a so that the light may reach the upper surface 12a of the microshutter. The light is an ultraviolet light, if the photosetting material 21 is mad of an acrylic ester polymer mixed with an initiator.

The light beam 25 passes through the light transmittance distribution mask 22 and the liquid crystal shutter 12 to thereby be outputted from the lower surface 12b of the microshutter 12 into the photosetting material 21. The light having reached the photosetting material 21 has a power density distributed approximately in a Gaussian distribution with its center position corresponding to a center of the bottom surface 12b of the microshutter 12, since the light has passed through the light transmittance distribution mask 22. Degree of setting of the photosetting material corresponds to the power density distribution of light radiated onto the photosetting material. Therefore, the photosetting material 21 is partially set to form a set portion 23 on the lower surface 12b of each of the microshutters 12. The set portion 23 is conically shaped with its center corresponding to a center of the microshutter 12, as shown in FIG. 2.

For example, in order to produce a conically shaped set portion 23 to be utilized in an optical scanning apparatus for attaining a resolution of 300 dpi, an ultraviolet light having a wavelength of 360 nm and a power of 300 microwatts is radiated onto the photosetting material 21 for about 100 microseconds.

(D) After the set portions 23 are formed, the lower surface 15b of the shutter array 15 is taken out of the photosetting material 21. Unset material is washed out, for example, through ultrasonic cleaning using acetone. Then, the entire lower surface 15b of the shutter array 15 is irradiated with the light for setting the material, so that the set portion 23 is completely hardened, to thereby form the microlens 16.

The above-described processes (A) through (D) are performed in a nitrogen atmosphere, since the photosetting material 21 does not harden in an oxygen atmosphere.

The set portion 23 formed on the lower surface of the liquid crystal shutter array 15 through the processes (A) through (D) has a connex shape and a refractive index suitable for lens performance. Furthermore, the set portion 23 has a refractive index distribution such that the refractive index is increased from an outer peripheral portion of the set portion 23 to a central portion of the set portion 23 because the density of the hardened polymer inside the set portion 23 is increased from the outer peripheral portion of the set portion 23 to the central portion of the set portion. Therefore, the propagation velocity of light inside the set portion 23 is decreased from the outer peripheral portion of the set portion to the central portion of the set portion. Since the set portion 23 has a shape and a refractive index distribution as described above, the set portion 23 serves as a lens and prevents light passing therethrough from spreading. Therefore, the set portion 23 serves as the microlens 16 for focusing the light onto a peripheral surface of the photosensitive drum 20. The set portion 23 has a light transmittance distribution property such that light having passed through the set portion 23 has a power density distributed approximately in a Gaussian distribution.

According to this method, the photosetting resin is irradiated with light which has passed through the light transmittance distribution mask 22, so that the photosetting resin is partially hardened to form the microlens 16. Therefore, it becomes possible to easily provide the small microlens 16 on a very small liquid crystal shutter. Furthermore, it becomes possible to easily produce the microlens 16 which has a shape to accurately focus the light onto the photosensitive drum.

Figure 3:
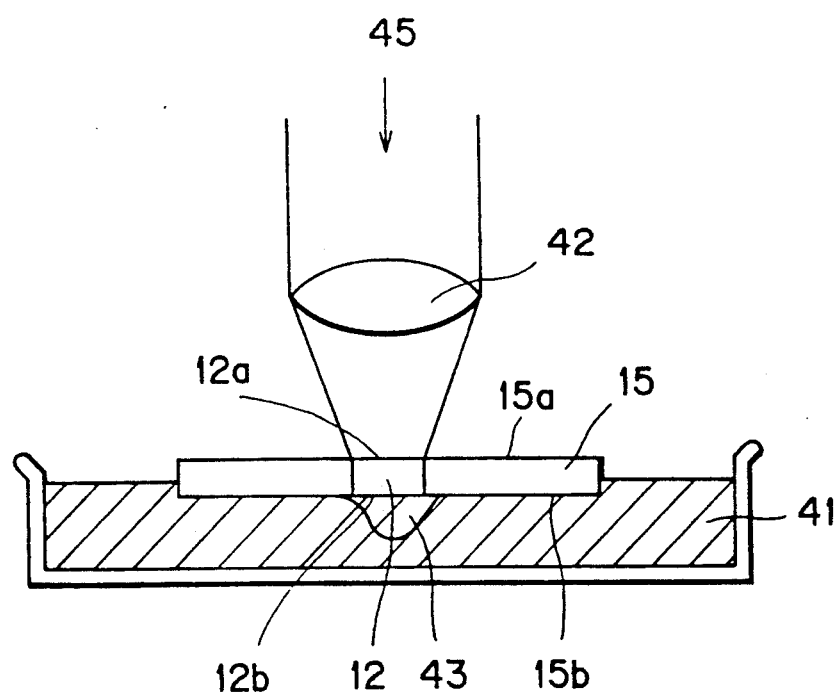
FIG. 3 is a view illustrating another method for producing a microlens of the present invention.

Another method for producing the microlens 16 will be described below with reference to FIG. 3. According to this method, a photosetting resin is hardened by an optically focusing means to form the microlens.

The microlens 16 is formed on the lower surface 15b of the liquid crystal shutter array 15 by the following steps.

(A') The lower surface 15b of the liquid crystal shutter array 15 is immersed in a photosetting material 41. The photosetting material 41 is such a material as made of, for example, an acrylic ester polymer mixed with an initiator. The acrylic ester polymer is an ultraviolet light setting resin with its refractive index n of about 1.54 when hardened.

(B') Only one of the microshutters 12 is opened for producing one microlens 16 on the shutter with other microshutters being closed. An optical focusing means such as a convex optical lens 42 is accurately positioned above the upper surface 12a of the opened one microshutter 12.

(C') Light 45 for setting the material 41 is radiated onto the lens 42 so that the light may enter the opened microshutter, with its optical axis passing through a center of the microshutter perpendicularly to the upper surface 12a of the microshutter. The lens 42 focuses the light 45 onto the lower surface 12b of the microshutter 12. The light is ultraviolet light if the photosetting material 41 is made of an acrylic ester polymer mixed with an initiator.

Figure 4:
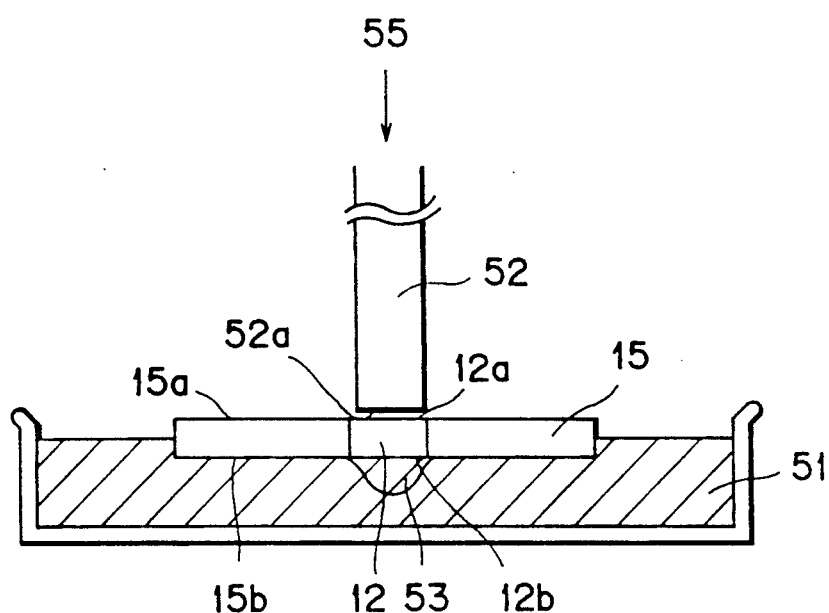
FIG. 4 is a view illustrating a still another method for producing a microlens of the present invention.

The light beam 45 passes through the lens 42 and the liquid crystal shutter 12 to be outputted from the lower surface 12b of the microshutter 12 into the photosetting material 41. Since the light has been focused by the lens 42, the light has a power density distributed approximately in a Gaussian distribution with its center position being a center of the lower surface 12b of the liquid crystal microshutter 12. Setting of the photosetting material corresponds to the power density distribution of the light radiated onto the photosetting material. Therefore, the photosetting material is partially set, thereby to form a set portion 43 on the lower surface 12b of the microshutter 12. The set portion 43 is conically shaped with its center corresponding to a center of the microshutter 12, as shown in FIG. 4.

For example, in order to produce the conically shaped set portion 43 to be utilized in an optical scanning apparatus for attaining a resolution of 300 dpi, a ultraviolet light having a wavelength of 360 nm and a power of 300 microwatts is radiated onto the photosetting material 21 for about 100 microseconds.

(D') The above-described processes (B') and (C') are performed for all of the microshutters 12, so that the set portions 43 are formed at all of the microshutters 12 on the lower surface 15b of the shutter array 15.

(E') After the set portions 23 are formed, the lower surface 15b of the shutter array 15 is taken out of the photosetting material 41. Unset material is washed out, for example, through ultrasonic cleaning using acetone. Then, the entire lower surface 15b of the shutter array 15 is irradiated with the light for setting the material, so that the set portion 43 is completely hardened to form the microlenses 16.

The above-described processes (A') through (E') are performed in a nitrogen atmosphere, since the photosetting material 41 does not harden in an oxygen atmosphere.

The set portion 43 formed on the lower surface 15b of the liquid crystal shutter array 15 through the processes (A') through (E') has a convex shape and a refractive index suitable for lens performance. Furthermore, the set portion 43 has a refractive index distribution such that the refractive index is increased from an outer peripheral portion of the set portion 43 to a central portion of the set portion 43 because the density of the hardened polymer inside the set portion 43 is increased from the outer peripheral portion of the set portion 43 to the central portion of the set portion. Therefore, the propagation velocity of the light inside the set portion 43 is decreased from the outer peripheral portion of the set portion 43 to the central portion of the set portion 43. Since the set portion 43 has such a shape and a refractive index distribution as described above, the set portion 43 serves as a lens and prevents light passing therethrough from spreading. Therefore, the set portion 43 serves as the microlens 16 for focusing light onto a peripheral surface of the photosensitive drum 20. The set portion 43 has a light transmittance distribution property such that light having passed through the set portion 43 has a power density distributed approximately in a Gaussian distribution.

According to this method, the photosetting resin is irradiated with light which has been focused by the optical focusing means 42, so that the photoseting resin is partially hardened to form the microlens 16. Therefore, it becomes possible to easily provide the small microlens 16 on a very small liquid crystal shutter. Furthermore, it becomes possible to easily produce the microlens 16 which has such a shape for accurately focusing light onto the photosensitive drum.

Still another method for producing the microlens 16 will be described with reference to FIG. 4. According to this method, a photosetting resin is hardened by light emitted from a light transmitting path to thereby form the microlens.

The microlens 16 is formed on the lower surface 15b of the liquid crystal shutter array 15 by the following steps.

(A'') The lower surface 15b of the liquid crystal shutter array 15 is immersed in a photosetting material 51. The photosetting material 51 is made of, for example, an acrylic ester polymer mixed with an initiator. The acrylic ester polymer is an ultraviolet light setting resin with a refractive index n of about 1.54 when hardened.

(B'') Only one of the microshutters 12 is opened for producing one microlens 16 on the shutter with other microshutters being closed. A light transmitting path such as an optical fiber 52 is provided so that the fiber 52 may transmit light 55 for setting the material 51 onto the opened microshutter 12. The optical fiber 52 is accurately positioned on the upper surface 12a of the microshutter 12 such that a light emitting end 52a of the fiber 52 contacts the upper surface 12a of the opened microshutter 12.

(C'') Light 55 for setting the material 51 is emitted from the end 52a of the optical fiber 52 so that the light may enter the opened microshutter 12 with its optical axis passing through a center of the microshutter perpendicularly to the upper surface 12a of the microshutter. The light is an ultraviolet light, if the photosetting material 51 is made of an acrylic ester polymer mixed with an initiator.

Figure 5:
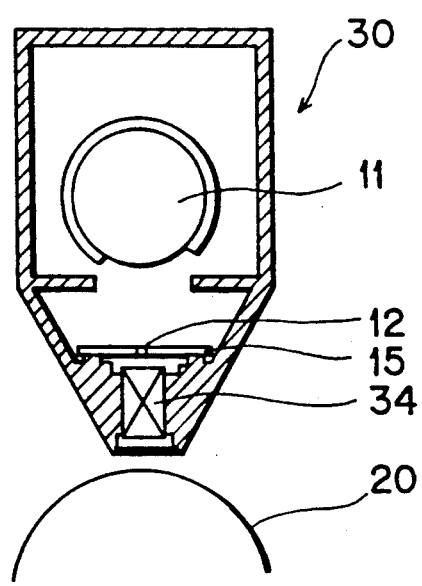
FIG. 5 is a schematic sectional view of an optical scanning device.

The light beam 55 passes through the liquid crystal shutter 12 and is outputted from the lower surface 12b of the microshutter 12 into the photosetting material 51. Since the light has been emitted from the end 52a of the optical fiber 52, the light has a power density distributed approximately in a Gaussian distribution with its center position being a center of the lower surface 12b of the liquid crystal microshutter 12. Degree of setting of the photosetting material corresponds to the power density distribution of the light radiated onto the photosetting material. Therefore, the photosetting material is partially set, thereby to form a set portion 53 on the lower surface 12b of the microshutter 12. The set portion 53 is conically shaped with its center corresponding to a center of the microshutter 12, as shown in FIG. 5.

For example, in order to produce the conically shaped set portion 53 to be utilized in an optical scanning apparatus for attaining a resolution of 300 dpi, an ultraviolet light having a wavelength of 360 nm and a power of 300 microwatts is radiated onto the photosetting material 21 for about 100 microseconds.

(D'') The above-described processes (B'') and (C'') are performed for all of the microshutters 12, so that the set portions 53 are formed at all of the microshutters 12 on the lower surface 15b of the shutter array 15.

(E'') After the set portions 53 are formed, the lower surface 15b of the shutter array 15 is taken out of the photosetting material 51. Unset material is washed out, for example, through ultrasonic cleaning using acetone. Then, the entire lower surface 15b of the shutter array 15 is irradiated with the light for setting the material, so that the set portion 53 is completely hardened to thereby form the microlenses 16.

The above-described processes (A'') through (E'') are performed in a nitrogen atmosphere, since the photosetting material 51 does not harden in an oxygen atmosphere.

The set portion 53 formed on the lower surface 15b of the liquid crystal shutter array 15 through the processes (A'') through (E'') has a convex shape and a refractive index suitable for lens performance. Furthermore, the set portion 53 has a refractive index distribution such that the refractive index is increased from an outer peripheral portion of the set portion 53 to a central portion of the set portion 53 because the density of the set polymer inside the set portion 53 is increased from the outer peripheral portion of the set portion 53 to the central portion of the set portion 53. Therefore, the propagation velocity of light inside the set portion 53 is decreased from the outer peripheral portion of the set portion 53 to the central portion of the set portion. Since the set portion 53 has such a shape and a refractive index distribution as described above, the set portion 53 serves as a lens and prevents light passing therethrough from spreading. Therefore, the set portion 53 serves as the microlens 16 for focusing light onto a peripheral surface of the photosensitive drum 20. In other words, the set portion 53 has a light transmittance distribution property such that light having passed through the set portion 53 has a power density distributed approximately in a Gaussian distribution.

According to this method, the photosetting resin is irradiated with light which has been emitted from the optical transmitting path 52, so that the photosetting resin is partially hardened to form the microlens 16. Therefore, it becomes possible to easily provide a small microlens 16 on a very small liquid crystal shutter. Furthermore, it becomes possible to easily produce the microlens 16 which has a shape to accurately focus light onto the photosensitive drum.

The optical scanning apparatus 10 having the microlenses 16 performs as follows.

As shown in FIG. 1, light is always emitted from the light source 11 and is uniformly radiated onto an entire surface of the upper surface 15a of the liquid crystal shutter array 15. Image signals are applied to the microshutter array 15 so that the microshutters 12 are selectively opened and closed. The light radiated on the microshutter array 15 passes through only the opened microshutters 12 to generate optical dot patterns corresponding to the image signals 3a and each optical dot corresponds to a picture element. The light passes through the microshutters 12 and then passes through the microlenses 16. Light is focused onto the peripheral surface of the photosensitive drum 20 as a result of preventing the light from spreading.

Thus, one line on the peripheral surface of the drum 20 extending parallel to the rotational axis of the drum and confronting the optical scanning device 10 is exposed to the dot pattern light emitted from the microlenses 16. The drum 20 is rotated by a drive source (not shown), so that another line next to the exposed line is placed to confront to the device 10 and the line is exposed to optical dot patterns emitted from the microlens 16. The photosensitive drum 20 is rotated such that lines on the peripheral surface of the drum are exposed one by one to the light of the dot patterns to form a latent image corresponding to the image signals on the peripheral surface of the photosensitive drum 20. With the use of a well-known toner supplying means (not shown in the drawing), toner is attached to the peripheral surface of the drum to develop the latent image, and a visible toner image is formed on the peripheral surface of the drum 20. The visible toner image is transferred to an image supporting medium such as a sheet of paper.

As described above, according to the light scanning device of the present invention, since a focusing means such as the microlens 16 is provided on each of the liquid crystal shutters 12, light passing through the shutter 12 can be prevented from spreading. As a result, it becomes possible to accurately focus the light onto the peripheral surface of the photosensitive drum. Furthermore, a light scanning device of the present invention may be made cheaper and smaller in comparison with the light scanning device using an optical system such as a light-focusing fiber lens array.

Furthermore, according to the present invention, the photosetting resin is irradiated with light which has passed through the light transmittance distribution mask, light focused by the optical focusing means, or light emitted from the optical transmitting path, so that the photosetting resin is partially hardened to form the focusing means. Therefore, it becomes possible to easily provide a small focusing means on a very small liquid crystal shutter. It becomes possible to easily produce the focusing means which has such a shape so as to accurately focus light onto the photosensitive drum.

The present invention is not limited to the above-described embodiments, but several changes may be possible without departing from the spirit or scope thereof.

What is claimed is:

1. A light scanning device, comprising:
a light source for emitting light;
a liquid crystal shutter array having a plurality of liquid crystal shutters arranged in a first direction, said liquid crystal shutter array receiving image signals to selectively open the liquid crystal shutters in response to the image signals, to thereby selectively allow the light emitted from said light source to pass therethrough;
conveying means for conveying a photosensitive member for receiving the light which has passed through said liquid crystal shutter array, said conveying means conveying the photosensitive member in a second direction perpendicular to the first direction to thereby form a latent image thereon corresponding to the image signals; and
focusing means provided on said liquid crystal shutter array for focusing the light having passed through said liquid crystal shutter array onto the photosensitive member conveyed by said conveying means, said focusing means including a plurality of microlenses provided respectively on said plurality of liquid crystal shutters, each of the microlenses being formed of a photosetting material which is provided on a corresponding liquid crystal shutter and having a same power density distribution as a power density distribution of a photosetting light beam used to harden said photosetting material, each of the microlenses having a light transmittance distribution property such that light having passed through each of the microlenses has said power density distribution of said photosetting light beam.

2. The light scanning device claimed in claim 1, wherein said photosetting material is a photosetting resin.

3. The light scanning device claimed in claim 2, wherein said photosensitive member comprises a rotatable photosensitive drum having a peripheral surface formed of photosensitive material for receiving the light having passed through said liquid crystal shutter array.

4. The light scanning device claimed in claim 3, further comprising:
means for preventing toner on the peripheral surface of said photosensitive drum from being attached to said focusing means.

5. The light scanning device claimed in claim 2, wherein the photosetting resin is made of a light setting resin curable by ultraviolet light.

6. The light scanning device claimed in claim 5, wherein the light setting resin is acrylic ester polymer having a refractive index of about 1.54 when hardened.

7. The light scanning device claimed in claim 1, wherein the photosetting light beam used to harden each of said plurality of microlenses has a power density distributed in Gaussian distribution, so that each of said plurality of microlenses has a light transmittance distribution property so that light having passed through each of the microlenses has a power density distributed in Gaussian distribution.

8. A liquid crystal shutter array device for forming an optical image, comprising:
a plurality of liquid crystal shutters for selectively allowing light emitted thereto to pass therethrough in response to image signals applied to said plurality of liquid crystal shutters; and
a plurality of microlenses respectively provided on said plurality of liquid crystal shutters for converging the light passing through said plurality of liquid crystal shutters to thereby form an optical image corresponding to the image signals, each of said microlenses being formed of a photosetting material and having a same power density distribution as a power density distribution of a photosetting light beam used to harden said photosetting material, each of the microlenses having a light transmittance distribution property such that light having passed through each of the microlenses has said power density distribution of said photosetting light beam.

9. The liquid crystal shutter array device claimed in claim 8, wherein said photosetting material is a photosetting resin.

10. The liquid crystal shutter array device claimed in claim 9, wherein said photosetting resin is made of light setting resin curable by ultraviolet light.

11. The liquid crystal shutter array device claimed in claim 10, wherein said light setting resin is an acrylic ester polymer having a refractive index of about 1.54 when hardened.

12. The liquid crystal shutter array device claimed in claim 11, wherein the photosetting light beam used to harden each of said microlenses has a power density distributed in Gaussian distribution, so that each of said plurality of microlenses has a light transmittance distribution property so that light having passed through each of said plurality of microlenses has a power density distributed in Gaussian distribution.

* * * * *